(12) United States Patent
D'Angelo et al.

(10) Patent No.: US 7,702,476 B2
(45) Date of Patent: Apr. 20, 2010

(54) METHOD OF CONTROLLING THE QUALITY OF INDUSTRIAL PROCESSES AND SYSTEM THEREFOR

(75) Inventors: Giuseppe D'Angelo, Grugliasco (IT); Giorgio Pasquettaz, Vercelli (IT)

(73) Assignee: CRF Societa Consortile per Azioni, Orbassano (Torino) (IT)

( * ) Notice: Subject to any disclaimer, the term of this patent is extended or adjusted under 35 U.S.C. 154(b) by 1407 days.

(21) Appl. No.: 11/086,572

(22) Filed: Mar. 23, 2005

(65) Prior Publication Data

US 2005/0288811 A1 Dec. 29, 2005

(30) Foreign Application Priority Data

Jun. 24, 2004 (EP) .................................. 04425458

(51) Int. Cl.
*G01N 37/00* (2006.01)
(52) U.S. Cl. ....................................................... 702/84
(58) Field of Classification Search .................... 702/84
See application file for complete search history.

(56) References Cited

U.S. PATENT DOCUMENTS

| 5,517,420 A | 5/1996 | Kinsman et al. | |
|---|---|---|---|
| 2002/0144984 A1* | 10/2002 | Mori et al. ............. | 219/121.64 |
| 2003/0218050 A1 | 11/2003 | Kanemoto et al. | |

FOREIGN PATENT DOCUMENTS

EP 1 275 464 A1 1/2003

OTHER PUBLICATIONS

R. Drai, et al.: "Time Frequency and Wavelet Transform Applied to Selected Problems in Ultrsonics NDE", NDT & E International, Butterworth-Heinemann, Oxford, GB, vol. 35, No. 8, Dec. 2002m pp. 567-572, XP004395862, ISSN: 0963-8695.
G. Andria, et al.: "Digital Measuring Techniques for High Accuracy Ultrasonic Sensor Application" Instrumentation and Measurement Technology Conference, 1998. IMTC/98. Conference Proceedings. IEEE St. Paul, MN, USA, May 18-21, 1998, New York, NY, USA, IEEE, US, MNay 18, 1998, pp. 1056-1061, XP010281821, ISBN: 0-7803-4797-8.

* cited by examiner

*Primary Examiner*—Bryan Bui
*Assistant Examiner*—Jonathan Teixeira Moffat
(74) *Attorney, Agent, or Firm*—Sughrue Mion, PLLC

(57) ABSTRACT

A system for controlling the quality of industrial processes including the steps of: having one or more reference signals relating to the industrial process, acquiring one or more real signals which are indicative of the quality of said industrial process, obtaining a transformed signal from the reference signal, obtaining a transformed signal from the real signal, calculating energies of the transformed reference and real signals, comparing the one or more reference signals to the one or more real signals to identify defects in the industrial process. Also, the comparing step includes: comparing the energies of the transformed reference and real signals to each other to extract corresponding time frequency distributions for selected frequency values, calculating energies of the time frequency distributions, and comparing the energies of the time frequency distributions with threshold values to identify energy values associated to defects.

12 Claims, 4 Drawing Sheets

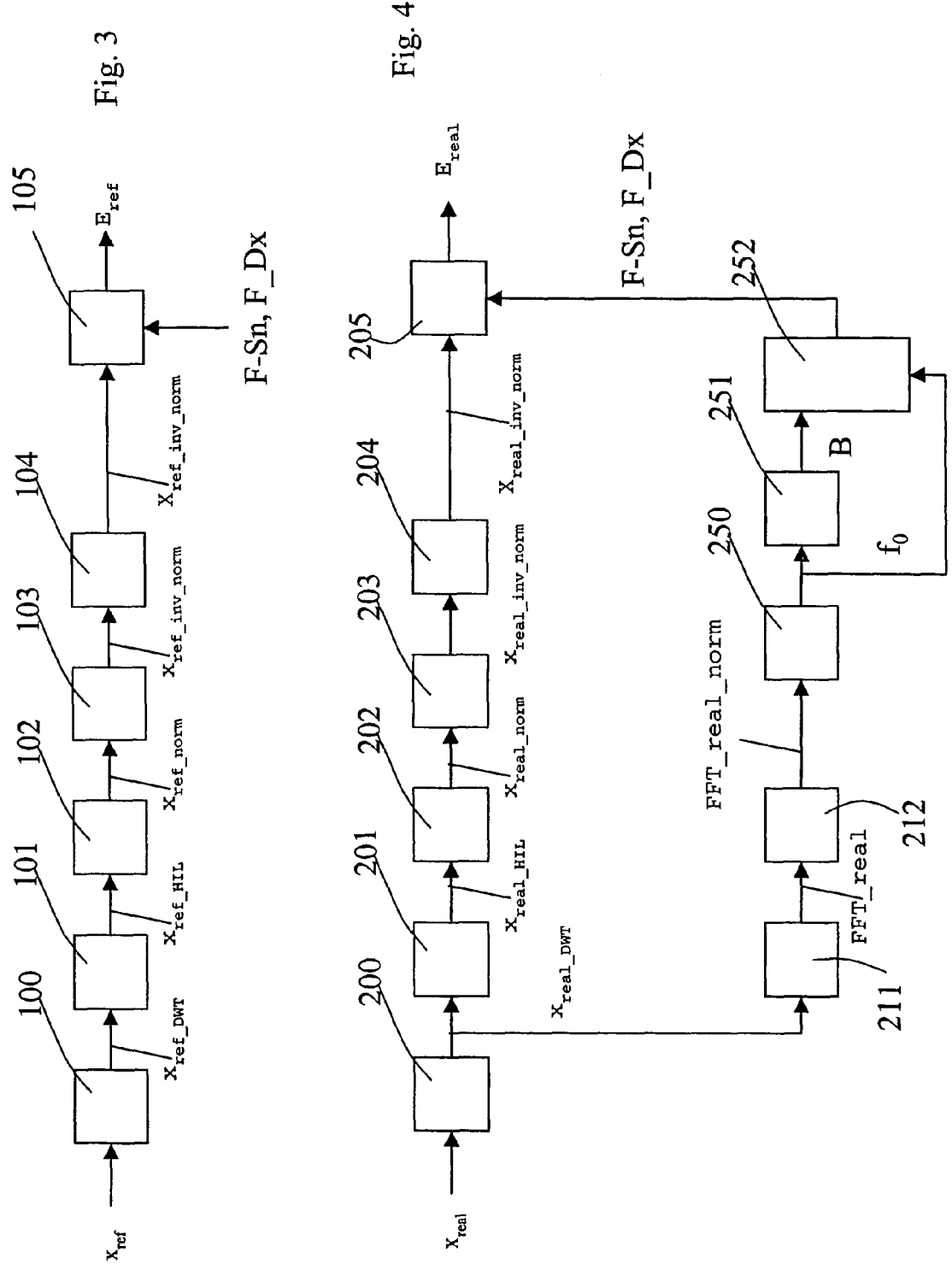

METHOD OF CONTROLLING THE QUALITY OF INDUSTRIAL PROCESSES AND SYSTEM THEREFOR

This Application claims priority from European Patent Application No. 04425458.9 filed Jun. 24, 2004.

BACKGROUND OF THE INVENTION

The present invention relates to methods for controlling the quality of an industrial process, comprising the steps of:

making available one or more reference signals relating to the industrial process acquiring one or more real signals indicating the quality of said industrial process, comparing said one or more reference signals to said one or more real signals to identify defects of said industrial process Monitoring defects in industrial processes is assuming a growing economic importance due to its impact in the analysis of the quality of industrial products. The ability to obtain an assessment of the quality of the industrial process in line and automatically has many advantages, both in economic terms and in terms of process velocity. Therefore, the desirable characteristics of the system are:

on line and real time processing;

ability to recognise the main production defects with accuracy.

Currently, the problem of recognising the quality of an industrial process, and thus of identifying any defects, takes place through an off-line inspection by experts, or with automatic methods which, through sensors, identify only some of the aforementioned defects, in a manner that is not satisfactory and that is also sensitive to the different settings of the machine.

Methods and systems for controlling the quality of industrial processes are known, for instance applied to the on-line monitoring of the laser welding process, in particular in the case of metal sheet welding. The controlling system is able to assess the presence of porosities in the welded area or, in the case of butt-weeded thin metal sheets, the presence of defects due to the superposition or to the disjunction of the metal sheets.

Said used systems base quality control on a comparison between the signals obtained during the process and one or more predetermined reference signals, indicative of a high quality weld. Said reference signals, usually in a variable number between two and ten, are predetermined starting from multiple samples of high quality welds. Obviously, this way of proceeding implies the presence of an experienced operator able to certify the quality of the weld at the moment of the creation of the reference signals, entails time wastage and at times also material wastage (which is used to obtain the samples needed to obtain the reference signals). In some cases, reference signals indicating a defective weld are also arranged, and this entails additional problems and difficulties.

The European patent application EP-A-1275464 in the name of the present Applicant teaches to divide into blocks the signal acquired by means of a photodiode which collects the radiation emitted by a weld point, calculating the mean of the signal in each sampled block and taking in account the blocks whose value is lower than or equal to the offset of the photodiode to be indicative of the presence of a defect. Said method eliminates the need for the reference, but it allows for a very approximate detection of defects.

SUMMARY OF THE INVENTION

The object of the present invention is to overcome all the aforesaid drawbacks.

In view of achieving said object, the invention relates to a method for controlling the quality of industrial processes having the characteristics set out at the beginning and further characterised by the fact that it further comprises the operations of:

obtaining a transformed signal from said reference signal;

obtaining a transformed signal from said real signal;

calculating energies of said transformed signals, respectively reference and real signal;

said comparison operation comprising:

comparing said energies of said transformed signals, respectively reference and real, to each other to extract corresponding time frequency distributions for selected frequency values;

calculating energies of said time frequency distributions;

comparing the energies of said time frequency distributions with threshold values to identify energy values associated to defects.

In the preferred embodiment, said steps of obtaining a transformed signal from said reference signal and of obtaining a transformed signal from said real signal comprise a filtering operation by the application of a DWT (Discrete Wavelet Transform), whilst said operation of comparing said energies of said transformed signals, respectively reference and real, to obtain corresponding time frequency distributions comprises operating a calculation of the conjugate of the Fourier transform of the envelope of the real signal and of the envelope of the normalised signal, obtaining conjugate transformed signals, respectively real and reference, and comparing the energies of the reference signal and of the real signal, extracting the frequency values for which the energy of the real signal is greater than the reference signal.

Naturally, the invention also relates to the system for controlling the quality of industrial which implements the method described above, as well as the corresponding computer product directly loadable into the memory of a digital computer such as a processor and comprising software code portions to perform the method according to the invention when the product is executed on a computer.

BRIEF DESCRIPTION OF THE DRAWINGS

Additional characteristics and advantages of the present invention shall become readily apparent from the description that follows with reference to the accompanying drawings, provided purely by way of non limiting example, in which:

FIGS. 3, 4 and 5 are flowcharts representing operations of the method according to the invention;

DETAILED DESCRIPTION OF THE INVENTION

The method according to the invention shall now be exemplified with reference to a laser welding method. Said laser welding method, however, constitutes only a non limiting example of industrial process to which the method for controlling the quality of industrial processes according to the invention can be applied.

Figure 1:
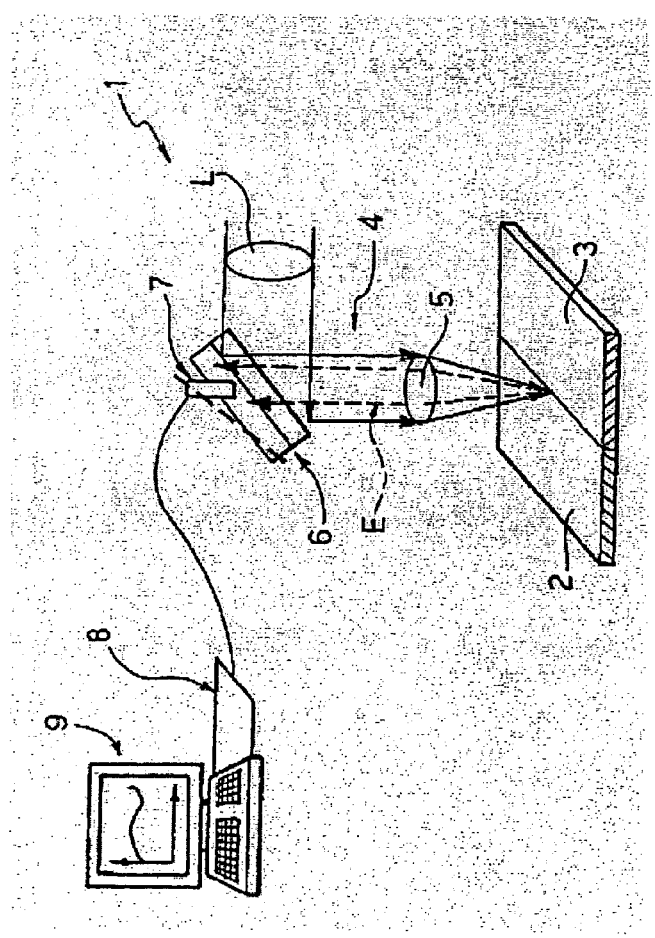
FIG. 1 is a block diagram showing a system that implements the method according to the invention.

With reference to FIG. 1, the number 1 designates as a whole a system for controlling the quality of a laser welding process. The example refers to the case of two metal plates 2, 3 which are welded by means of a laser beam. The number 4 designates the focusing head as a whole, including a lens 5 whereat arrives the laser beam originated by a laser generator (not shown) and reflected by a semi-reflecting mirror 6, after the passage through a lens L. The radiation E emitted by the weld area passes through the reflecting mirror 6 and is sensed by a sensor 7 constituted by a photodiode able to sent its output signal to an electronic control and processing unit 8 associated to a personal computer 9.

In an actual embodiment, the semi-reflecting mirror 6 used is a ZnSe mirror, with a diameter of 2 inches, thickness 5 mm. The sensor 7 is a photodiode with spectral response between 190 and 1100 nm, an active area of 1.1×1.1 mm and a quartz mirror.

Figure 2:
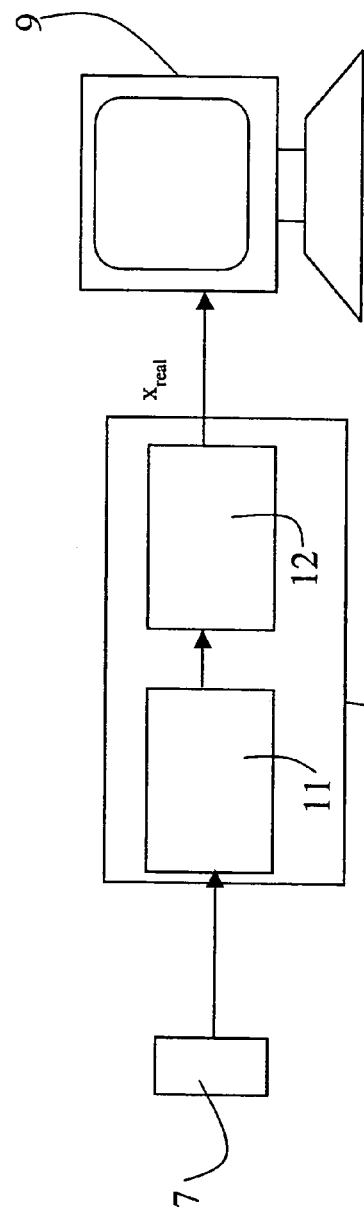
FIG. 2 shows a detail of the system of FIG. 1.

FIG. 2 shows in greater detail the control and processing electronic unit 8 associated to the personal computer 9. Said processing unit 8 comprises an antialiasing filter 11 which operates on the signal sent by the sensor 7, hence an acquisition board 12 is provided, equipped with an analog-digital converter, which samples the filtered signal and converts it into digital form. Said acquisition board 12 is preferably directly associated to the personal computer 9.

Also in the case of an actual embodiment, the acquisition card 12 is a PC card NI 6110E data acquisition card, with maximum acquisition frequency of 5 Ms/sec.

The antialiasing filter 11 filters the signal by means of a low pass filter (e.g. a Butterworth IIR filter).

In the personal computer 9 according to the invention is implemented a method for controlling quality, based on a comparison between a real signal $x_{real}$ acquired by means of the photodiode 7 and a reference signal $x_{ref}$, representing a defective weld, stored in said personal computer 9.

The reference signal, designated as $x_{ref}(t)$ is acquired at an acquisition frequency $f_s$, and hence, according to Nyquist's theorem, has associated a frequency band of the signal with value $f_s/2$, whilst the number of samples acquired for the reference signal $x_{ref}(t)$ is N.

FIG. 3 shows a flow chart which represents the operations conducted on the reference signal $x_{ref}(t)$.

In a first step 100 is executed a filtering operation of the reference signal $x_{ref}(t)$ by the application of a DWT (Discrete Wavelet Transform). At the output of the step 100, therefore, one obtains a signal $x_{ref\_DWT}$ having N/2 samples in the band $0:f_s/4$.

Subsequently, in a step 101 to the $x_{ref\_DWT}$ signal is applied a Hilbert transform operation, obtaining a complex analytical signal $x_{ref\_HIL}$, having N/2 samples and with null negative frequencies.

To said analytical signal $x_{ref\_HIL}$ is applied, in a step 102, a normalisation operation, which outputs a normalised signal $x_{ref\_norm}$.

On said normalised signal $x_{ref\_norm}$, in a step 103, an operation of calculating an envelope of the normalised signal, designated as $x_{ref\_inv\_norm}$, is performed, whilst in a step 104 to said envelope of the normalised signal $x_{ref\_inv\_norm}$ is applied a Fourier transform operation (FFT), obtaining a transformed envelope $X_{ref\_inv\_norm}$.

Lastly, in a step 105, an operation of calculating the energy of the reference signal, designated $E_{ref}$, is conducted, applying the following relationship:

$$\int |x_{ref\_inv\_norm}(t)|^2 dt = \int |X_{ref\_inv\_norm}(f)|^2 df \qquad (1)$$

In regard to the real signal $x_{real}(t)$, it is also acquired at an acquisition frequency $f_s$, and hence, according to Nyquist's theorem, has associated a frequency band of the signal with value $f_s/2$, whilst the number of samples acquired for the real signal $x_{real}(t)$ is N.

FIG. 4 shows a flow chart which represents the operations conducted on the real signal $x_{real}(t)$.

In particular, FIG. 4 shows a first step 200 in which a filtering operation of the real signal $x_{real}(t)$ is executed by the application of a DWT transform. At the output of the step 200, therefore, one obtains a signal $x_{real\_DWT}$ having N/2 samples in the band $0:f_s/4$.

On said signal $x_{real\_DWT}$, in a step 211, is performed a Fourier transform operation, obtaining a transformed signal $FFT_{real}$, which, subsequently, in a step 212, is normalised, obtaining a transformed normalised signal $FFT_{real\_norm}$.

In a step 250, on the transformed normalised signal $FFT_{real\_norm}$ an operation of calculating a mean frequency $f_0$ is conducted, according to the relationship:

$$f_0 = \int f * FFT_{real\_norm}(f) * FFT_{real\_norm}(f) df \qquad (2)$$

In a step 251, an operation of calculating a standard deviation B is conducted, according to the relationship:

$$B = (\int f^2 * FFT_{real\_norm} * FFT_{real\_norm} \, df - f_0^2)^{1/2} \qquad (3)$$

In a step 252 are then calculated a lower band $F\_Sn=(f_0-B/2)$ and an upper band $F\_Dx=(f_0+B/2)$.

In parallel, in a step 201, to the $x_{real\_DWT}$ signal is applied a Hilbert transform operation, obtaining a complex analytical signal $x_{real\_HIL}$, having N/2 samples and with null negative frequencies.

To said analytical signal $x_{real\_HIL}$ is applied, in a step 202, a normalisation operation, which outputs a normalised signal $x_{real\_norm}$.

On said normalised signal $x_{real\_norm}$, in a step 203, an operation of calculating the envelope, designated as $x_{real\_inv\_norm}$, is conducted, whilst in a step 204 to said envelope of the normalised signal $x_{real\_inv\_norm}$ is applied a Fourier transform operation (FFT), obtaining a transformed envelope $X_{real\_inv\_norm}$.

Lastly, in a step 205, an operation of calculating the energy of the real signal $E_{real}$ is performed, applying the following relationship:

$$\int |x_{real\_inv\_norm}(t)|^2 dt = \int |X_{real\_inv\_norm}(f)|^2 df \qquad (4)$$

The operations of calculating the energies $E_{real}$ and $E_{ref}$ are conducted in a band delimited between the lower band F_Sn and the upper band F_Dx calculated at the step 252. More in detail, the calculation is performed on the band so delimited, considering frequency steps, for example of one Hertz, i.e.:

In this way the operation of calculating the energies $E_{ref}$ and $E_{real}$ produces two respective vectors, respectively a vector of energies of the reference $$\int_{F\_Sn}^{step} |X_{real\_inv\_norm}(f)|^2 df \int_{step}^{FDX} |X_{real\_inv\_norm}(f)|^2 df$$

$$\int_{F\_Sn}^{step} |X_{ref\_inv\_norm}(f)|^2 df \int_{step}^{FDX} |X_{ref\_inv\_norm}(f)|^2 df$$

Energy_Ref_step (1, . . . k) and a vector of energies of the real signal Energy_Real_step (1, . . . k), both comprising k values in frequency.

Figure 5:
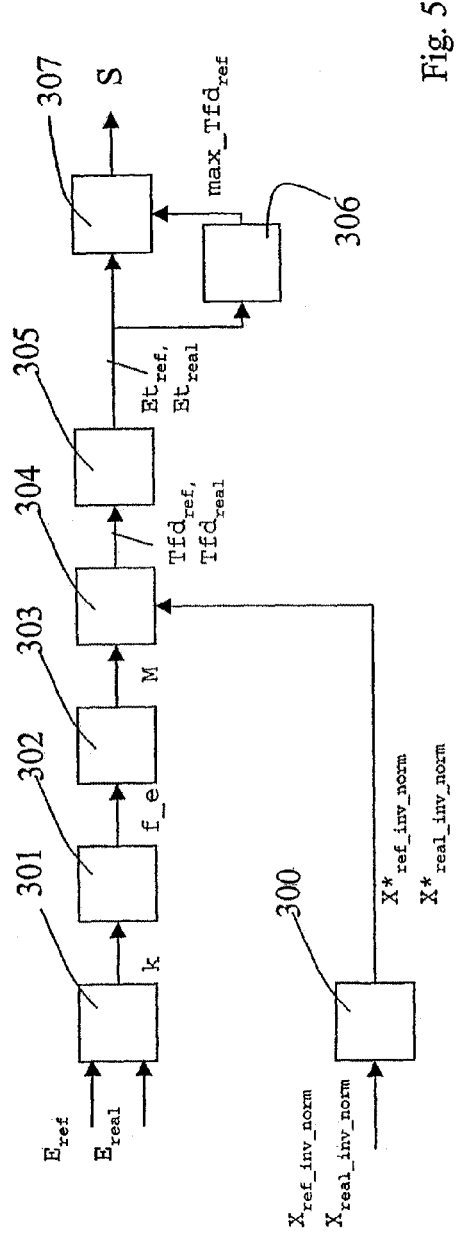

Subsequently, a procedure of calculating the time-frequency quadratic distributions is performed, shown in the flowchart of FIG. 5, and comprising the following operations:

in a step designated as 300, calculating the conjugate of the Fourier transform (FFT) of the envelope of the real signal $X_{real\_inv\_norm}(f)$ and of the envelope of the reference signal $X_{ref\_inv\_norm}(f)$, obtaining conjugate transformed signals, respectively real $X^*_{real\_inv\_norm}(f)$ and reference $X^*_{ref\_inv\_norm}(f)$;

in a step 301, taking in account the energies of the reference signal $E_{ref}$ and of the real signal $E_{real}$, represented by the respective energy vector of the reference Energy_Ref_step (1, ... k) and the energy vector of the real signal Energy_Real_step (1, ... k), and for each element k of said two vectors, evaluating whether the following criterion is met:

$$Energy\_Real\_step(1, \ldots k) > Energy\_Ref\_step(1 \ldots k) \quad (5)$$

Figure 6:
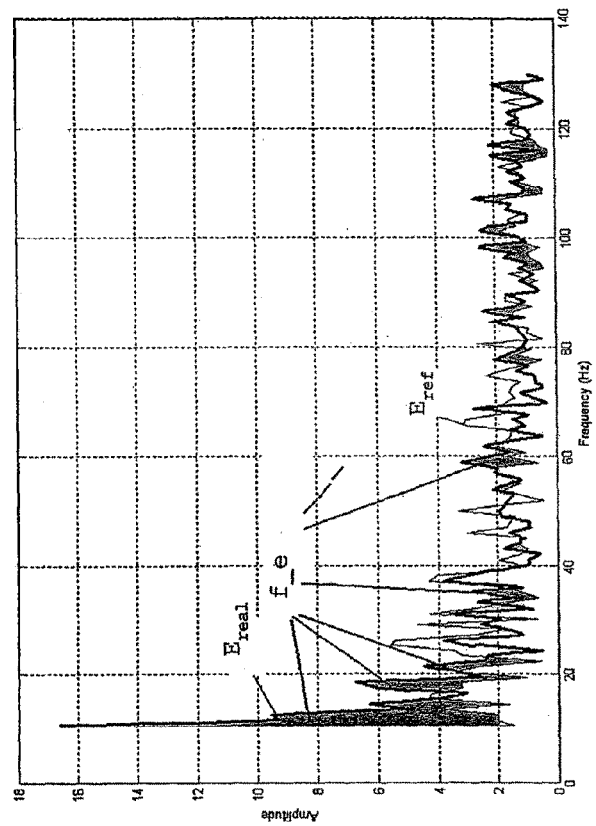
FIG. 6 is a diagram of quantities computed by the method according to the invention.

This operation can also be appreciated with reference to the chart of FIG. 6, which shows the amplitudes of the energies of the reference signal $E_{ref}$ and of the real signal $E_{real}$ (shown with thicker lines) as a function of frequency.

if the criterion (5) is met, then in a step 302 an operation of extracting the frequency value for which said criterion (5) is met is performed, said value being indicated as f_e. Depending on the number of times the condition is met, up to k values of frequency f_e are obtained. FIG. 6 shows the regions corresponding to the values of frequency f_e for which the criterion (5) is met;

in a step 303 a matrix M is constructed whose rows are constituted by extracted frequency values f_e, whilst the columns are constituted by N/2 time values $t_1 \ldots t_{N/2}$ of the output signal from the DWT transform operation 200;

in a step 304, for each row of the matrix M is calculated a time-frequency quadratic distribution both for the reference signal, designated as $Tfd_{ref}$ and for the real signal, designated $Tfd_{real}$, using the Margenau_Hill relationship, i.e.:

$$Tfd_{real} = Real(x_{real\_DWT}(t) \cdot X_{real\_inv\_norm}*(f) \cdot e^{-j2\pi f}) \quad (6)$$

$$Tfd_{ref} = Real(x_{ref\_DWT}(t) \cdot X_{ref\_inv\_norm}*(f) \cdot e^{-j2\pi f}) \quad (7)$$

in a step 305 for both reference and real signals are then calculated energies associated to the distributions for each time instant, respectively designated $Et_{ref}$ and $Et_{real}$;

in a step 306 is then calculated a maximum value of energy max_$Tfd_{ref}$ for the time frequency distribution of the reference $Tfd_{ref}$.

To obtain an estimate of the defects S, lastly in a step 307 each time value of the energy $Et_{real}$ of the time-frequency quadratic distribution of the real signal $Tfd_{real}$ is compared with the maximum value of energy max_$Tfd_{ref}$. If said value of the time-frequency quadratic distribution of the real signal $Tfd_{real}$ exceeds the maximum value of the energy max_$Tfd_{ref}$ then a defect is present at that time coordinate.

It is thereby possible to temporally locate defects.

Figure 7:
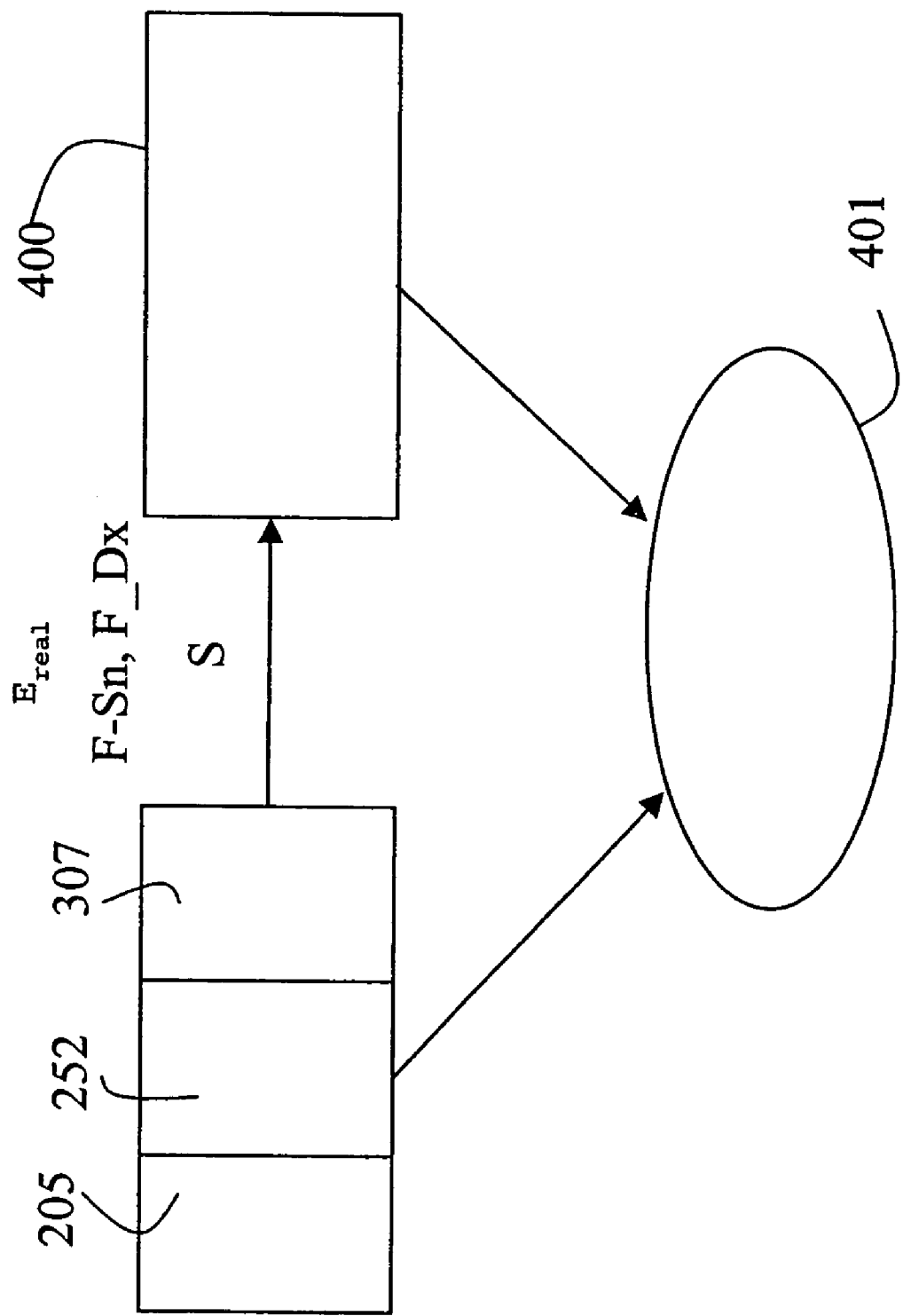
FIG. 7 is a flowchart representing operations of the method according to an exemplary embodiment of the invention relating to evaluating defects.

To evaluate the defects, with reference to FIG. 7, the quantities taken into consideration are the energy of the real signal $E_{real}$, originated at the step 205 of FIG. 4, as well as the lower band F_Sn=($f_0$−B/2) and the upper band F_Dx=($f_0$+B/2) of the defect calculated at the step 252. Lastly, the extension and location of the defect in the frequency band is considered, as evaluated at the step 307 of FIG. 5.

Said parameters, i.e. the energy of the real signal $E_{real}$, the lower band F_Sn and the upper band F_Dx, the extension and location of the defect, according to an aspect of the invention, are sent to a defect classifier 400 which, receiving at its input the identified characteristics (or a subset thereof) evaluates the quality of the weld as: "correct"/"not-correct"/"insufficient-penetration"/"discontinuous-laser-power"/"incorrect-mounting"/"porosity".

In this way advantageously, the outputs of the steps 205, 252 and 307, relating to the time/frequency analysis of defects are used to instruct the defect classifier 400 automatically, thereby avoiding steps of instructing the classifier 400 by an operator. Lastly, in a block 401 it is possible to cross check the results of the outputs of the steps 205, 252 and 307 and of the block 401 for a final evaluation of the defect.

Naturally, without altering the principle of the invention, the construction details and the embodiments may vary widely from what is described and illustrated purely by way of example herein, without thereby departing from the scope of the present invention.

What is claimed is:

1. A system for controlling the quality of an industrial process, comprising:
    a sensor for measuring one or more process parameters, and
    an electronic control and processing unit for processing the signals emitted by said sensor,
    wherein:
    said electronic control and processing unit processes the signals emitted by said sensor by performing the following steps:
    having one or more reference signals relating to the industrial process,
    acquiring one or more real signals which are indicative of the quality of said industrial process,
    obtaining a transformed signal from said reference signal,
    obtaining a transformed signal from said real signal,
    calculating energies of said transformed reference and real signals,
    comparing said one or more reference signals to said one or more real signals to identify defects in said industrial process,
    wherein said comparing step comprises:
        comparing said energies of said transformed reference and real signals to each other to extract corresponding time frequency distributions for selected frequency values;
        calculating energies of said time frequency distributions;
        comparing the energies of said time frequency distributions with threshold values to identify energy values associated to defects; and
        providing said energy values associated with the defects to a classifier,
    wherein the method further comprises providing said classifier with the energy of said real transformed signal.

2. The system as claimed in claim 1, wherein said steps of obtaining said transformed reference and real signals from said reference signal and said real signal comprise a filtering operation which uses a DWT (Discrete Wavelet Transform).

3. The system as claimed in claim 2, wherein said steps of obtaining said transformed reference and real signals from said reference signal and said real signal further comprise:
    applying a Hilbert transform to the signal obtained from the filtering operation;
    normalizing the signal obtained from the Hilbert transform operation;
    calculating an envelope of the normalized signal;
    applying an FFT transform to said envelope of the normalizing signal to obtain said transformed reference and real signals.

4. The system as claimed in claim 2, wherein the method further comprises:
    executing a Fourier transform operation on the real signal obtained from the filtering operation which applies said DWT transform to obtain a second transformed signal, and normalizing said second transformed signal to obtain a second transformed normalizing signal.

5. The system as claimed in claim 4, wherein the method further comprises:
processing said second transformed normalizing signal to obtain a set of values representing the spectrum of the real signal, and
providing values selected in said set of values to said classifier.

6. The system as claimed in claim 5, wherein the method further comprises using at least part of said set of values representing the spectrum of the real signal to calculate said energies of said transformed reference and real signals.

7. The system as claimed in claim 5 wherein the method further comprises a step of crossing the results of said classifier with one or more values selected among said energy values associated with the defects, said energy of said real transformed signal and said set of values representative of the spectrum of the real signal.

8. The system as claimed in claim 2, wherein said step of calculating energies of said time frequency distributions comprises the steps of:
calculating said energies for each time instant and also calculating a maximum value of energy;
using said maximum value of energy as a threshold value; and
comparing said maximum value of energy with each time value of energy of a time-frequency quadratic distribution of the real signal to identify energy values associated with defects.

9. The system as claimed in claim 1, wherein said step of comparing said energies of said transformed reference and real signals to obtain corresponding time frequency distributions comprises the steps of:
calculating a conjugate of a Fourier transform of said transformed reference and real signals to obtain conjugate transformed real and reference signals;
comparing the energies of the reference and real signals and extracting the frequency values for which the energy of the real signal is greater than the energy of the reference signal;
building a matrix whose rows are constituted by said extracted frequency values and whose columns are time values of the signal obtained from a filtering operation which uses a DWT transform;
calculating for each row of said matrix a time-frequency quadratic distribution for the reference signal and the real signal.

10. The system as claimed in claim 9, wherein said step of calculating for each row of said matrix the time-frequency quadratic distribution for the reference signal and the real signal is conducted by applying the Margenau-Hill relationship.

11. The system as claimed in claim 1, wherein said industrial process is a laser weld process.

12. A computer product which is loadable into the memory of an electronic computer and comprising software code portions which perform a method for controlling the quality of an industrial process comprising the steps of:
having one or more reference signals relating to the industrial process,
acquiring one or more real signals which are indicative of the quality of said industrial process,
obtaining a transformed signal from said reference signal,
obtaining a transformed signal from said real signal,
calculating energies of said transformed reference and real signals,
comparing said one or more reference signals to said one or more real signals to identify defects in said industrial process,
wherein said comparing step comprises:
comparing said energies of said transformed reference and real signals to each other to extract corresponding time frequency distributions for selected frequency values;
calculating energies of said time frequency distributions;
comparing the energies of said time frequency distributions with threshold values to identify energy values associated to defects; and
providing said energy values associated with the defects to a classifier,
wherein the method further comprises providing said classifier with the energy of said real transformed signal.

* * * * *